United States Patent
Sakai et al.

(10) Patent No.: US 7,170,596 B2
(45) Date of Patent: Jan. 30, 2007

(54) ATOMIC ABSORPTION SPECTROPHOTOMETER WITH A BACKGROUND CORRECTING FUNCTION

(75) Inventors: Masumi Sakai, Kyoto (JP); Kazuo Nagasawa, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 445 days.

(21) Appl. No.: 10/837,781

(22) Filed: May 4, 2004

(65) Prior Publication Data

US 2004/0223154 A1 Nov. 11, 2004

(30) Foreign Application Priority Data

May 8, 2003 (JP) .............................. 2003-129671

(51) Int. Cl.
*G01J 3/36* (2006.01)
(52) U.S. Cl. ...................... 356/307; 356/326
(58) Field of Classification Search ................ 356/307, 356/309, 312, 313–316, 326; 250/564; 313/618
See application file for complete search history.

(56) References Cited

U.S. PATENT DOCUMENTS 3,610,760 A * 10/1971 Lowe .......................... 356/315
4,462,685 A * 7/1984 Smith et al. ................. 356/307
5,528,362 A * 6/1996 Sasaki et al. ................ 356/307

FOREIGN PATENT DOCUMENTS

JP 5-306997 11/1993

* cited by examiner

*Primary Examiner*—Layla G. Lauchman
(74) *Attorney, Agent, or Firm*—Westerman, Hattori, Daniels & Adrian, LLP.

(57) ABSTRACT

An atomic absorption spectrophotometer including a self reverse type hollow cathode lamp and a photomultiplier tube further includes a preliminary tester for measuring a strength of a signal L when a smaller current is supplied to the hollow cathode lamp and a strength of a signal H when a larger current is supplied while a voltage V applied between a cathode and an anode of the photomultiplier is changed. It also includes an optimal voltage detector for detecting a value V0 of the voltage V at which a super ratio U (which is defined as a ratio of a first ratio L0/H0 to a second ratio L1/H1) is closest to unity under a condition that two values V1 and V0 of the voltage V are arbitrarily chosen so that a ratio H1/H0 or a ratio L1/L0 is a predetermined value. The value V0 is used in the following proper measurement of a sample analysis to apply voltage V to the photomultiplier tube of the photometric detector, where a larger current and a smaller current are alternately supplied to the hollow cathode lamp to perform the background correction. This automatically improves the accuracy of the background correction.

4 Claims, 4 Drawing Sheets

PRELIMINARY MEASUREMENT IN THE LARGER CURRENT PERIOD

PRELIMINARY MEASUREMENT IN THE SMALLER CURRENT PERIOD (BA: BACKGROUND ABSORPTION)

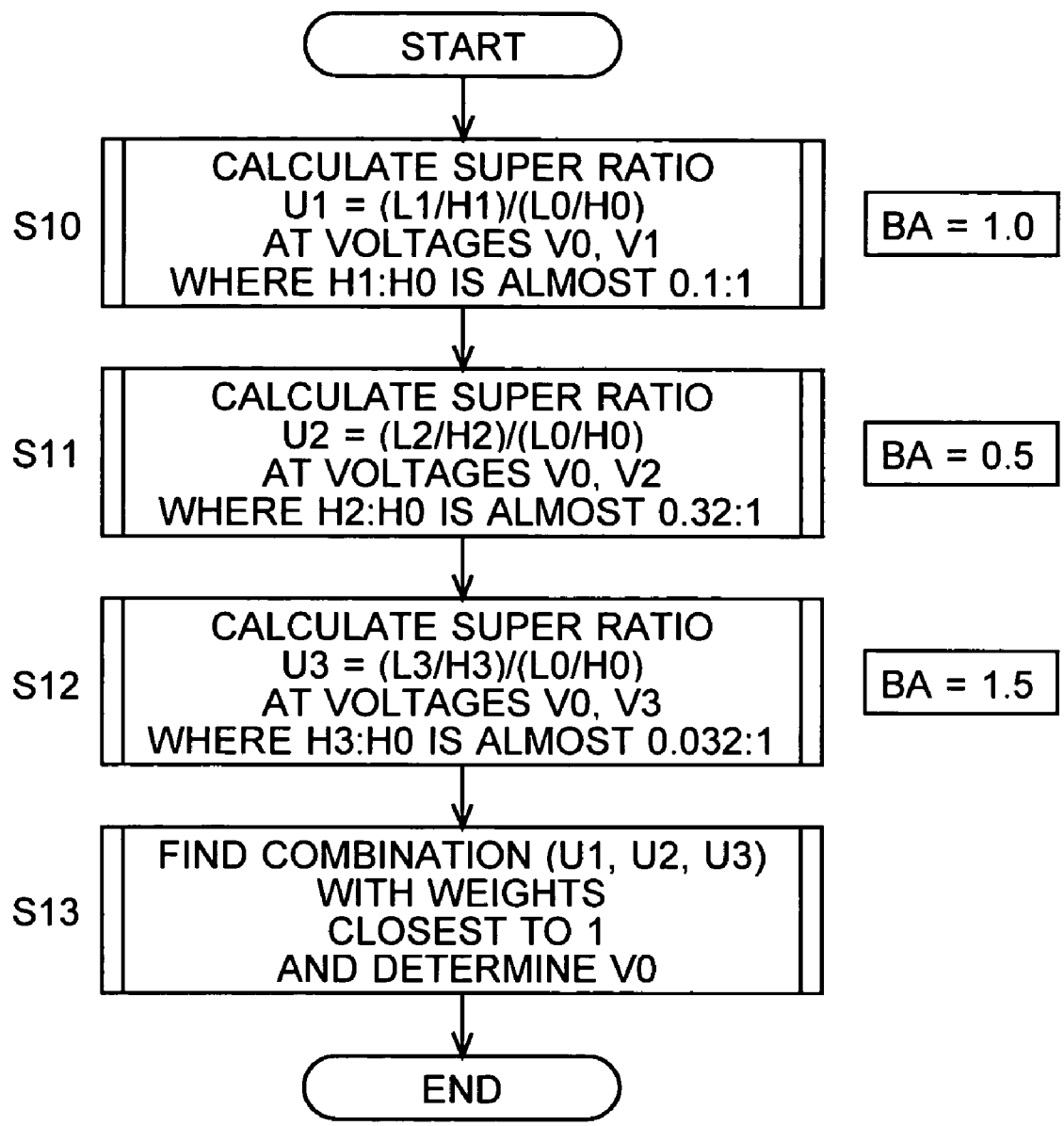

though the signal H and the signal L are supposed to exhibit little change, they may change due to the influence of various noises generated in the photometric signal. When the signal changes, the value of the ratio of the value H1 to the value H0 or the ratio of the value L1 to the value L0 changes too. The above cited predetermined value is the value of the ratio of the value H1 to the value H0 or the ratio of the value L1 to the value L0 when there is no influence of such noises.

ATOMIC ABSORPTION SPECTROPHOTOMETER WITH A BACKGROUND CORRECTING FUNCTION

The present invention relates to an atomic absorption spectrophotometer, especially to one having a background correcting function using the self reverse (SR) method.

BACKGROUND OF THE INVENTION

In an atomic absorption spectrophotometer, a background correction is normally made to avoid the influence of absorption other than that due to an object atomic element. JIS (Japanese Industrial Standards) K0121 "General rules for atomic absorption spectrochemical analysis" and EPA (Environmental Protection Agency) stipulates to use the SR method or the deuterium lamp method. The former method has an advantage over the latter in that it yields better correction accuracy and can be used in a wider range of wavelengths.

In the SR method, a self reverse type hollow cathode lamp (HCL) is used, where a smaller current of about 10 mA and a larger current of about 500 mA are alternately supplied to the HCL, as shown in FIG. 2. When the larger current is supplied, the shape of the emission spectrum of the HCL has a dip at the center like the letter "M", so that it undergoes little atomic absorption of the object element while the background absorption mainly occurs. When, on the other hand, the smaller current is supplied, the emission spectrum becomes a narrow peak, so that it undergoes both the atomic absorption of the object element and the background absorption. Taking the subtraction of the two absorptions, solely the atomic absorption of the object element is properly extracted while the background absorption is adequately corrected.

A measure of the accuracy of the background correction is the background correcting factor $\alpha$ (%), which is defined by the following formula.

$\alpha$={[absorption by a sample without object element after background correction]/[absorption by the background]}×100

The background correcting factor a approaches to zero as the correcting accuracy is enhanced.

In the SR method, the background correcting accuracy is impaired due to various differences in the conditions between the smaller current supplying period and the larger current supplying period. The emission noise of the HCL is an example of the cause of such differences. In order to decrease the difference (or error) in the correction, in conventional atomic absorption spectrophotometers, a sample hold circuit is provided for each of the photometric signal taken in the smaller current supplying period and the photometric signal taken in the larger current supplying period, and the RC time constants of the respective sample hold circuits are appropriately set to minimize the background correcting factor (Japanese Unexamined Patent Publication No. H05-306997). In many cases, another sample hold circuit is provided for the photometric signal taken in the bias current supplying period.

In order to appropriately set the RC time constants of the two sample hold circuits, the user has to adjust the value of the trimmer resistance or trimmer capacitor manually considering the result of the analysis. Such a manual adjustment is troublesome, and another problem is that the trimmer resistance or trimmer capacitor is an analog part whose value may change gradually. Further, using plural sample hold circuits solely for the purpose of a background correction is cost inefficient.

SUMMARY OF THE INVENTION

The present invention addresses the problem, and an object of the present invention is to provide an atomic absorption spectrophotometer that can perform the background correction at high accuracy without manual adjustment and with a simple structure.

The primary cause of deteriorated background correction is that the changing manner of the photometric signal in the larger current supplying period for obtaining the background absorption and the changing manner of the photometric signal in the smaller current supplying period for obtaining both the atomic absorption and the background absorption do not coincide. In order to compensate for the difference in the changing manners, conventionally, as mentioned above, the characteristic of the sample hold circuits for the respective photometric signals are adjusted. The present invention uses a novel method distinct from the conventional one to accord the changing manner of the light intensity signal in the larger current supplying period with that in the smaller current supplying method.

Usually, a photomultiplier tube is used for the detector of an atomic absorption spectrophotometer. The characteristics of a photomultiplier tube, typically its gain, change depending on the voltage applied externally between the cathode and anode. To each current-amplifying dinode of the photomultiplier tube, a division of the voltage is applied. The inventors of the present invention found that the voltage applied to the photomultiplier tube can change the ratio of the signal strength in the larger current supplying period to that in the smaller current supplying period. This led to the present invention where the voltage to the photomultiplier is controlled to accord the changing manners as much as possible.

According to the present invention, an atomic absorption spectrophotometer includes:

a self reverse type hollow cathode lamp;

a photomultiplier tube;

a preliminary measurement performer for measuring a strength of a signal L when a smaller current is supplied to the hollow cathode lamp and a strength of a signal H when a larger current is supplied while a voltage V applied between a cathode and an anode of the photomultiplier is changed; and an optimal voltage detector for detecting a value V0 of the voltage V at which a super ratio U is closest to unity under a condition that two values V1 and V0 of the voltage V are arbitrarily chosen so that a ratio of value H1 to value H0 of the signal H or a ratio of value L1 to value L0 of the signal L is a predetermined value, where the super ratio U is defined as a ratio of a first ratio L0/H0 to a second ratio L1/H1.

The value V0 is used in the following proper measurement of a sample analysis to apply voltage V to the photomultiplier tube of the photometric detector, where a larger current and a smaller current are alternately supplied to the hollow cathode lamp to perform the background correction.

The above cited predetermined value of the ratio of value H1 to value H0 or the ratio of value L1 to value L0 corresponds to the background absorption. When, for example, the predetermined value is 0.1, the background absorption is 1.0 (=−log0.1). When the background correction is performed for a value of the background absorption, the value is normally set at 1.0, in which case the predetermined value is set at 0.1 or 10.

When the background correction is set best at a value of the background absorption, the correction is not always best at another value of the background absorption. Thus, it is preferable to set a plurality of predetermined values, and consider a plurality of super ratios U calculated based on the predetermined values as a whole to make them closer to unity (one) in a well-balanced manner in determining the value V0 of the voltage V.

According to the atomic absorption spectrophotometer of the present invention, no manual adjustment by a user is necessary to enhance the accuracy of the background correction, so that the user is free from such a tedious adjusting work, and the quality of the background correction becomes independent of the user's skill. Since it does not use a rather unstable part or parts such as a trimmer resistance or a trimmer capacitor, the background correction becomes stable at high level. This can be achieved without using sample hold circuits as in the conventional method, which simplifies the apparatus and reduces the cost.

BRIEF DESCRIPTION OF THE DRAWINGS

FIG. 6 is a flowchart of the process for another preliminary adjustment for the background correction in the present embodiment.

DETAILED DESCRIPTION OF PREFERRED EMBODIMENTS

A furnace type atomic absorption spectrophotometer embodying the present invention is described referring to FIGS. 1 to 4. The furnace type is chosen here simply for the convenience of explanation, and, as is apparent in the following explanation, the present invention is applicable to any type of atomic absorption spectrophotometer including flame type.

Figure 1:
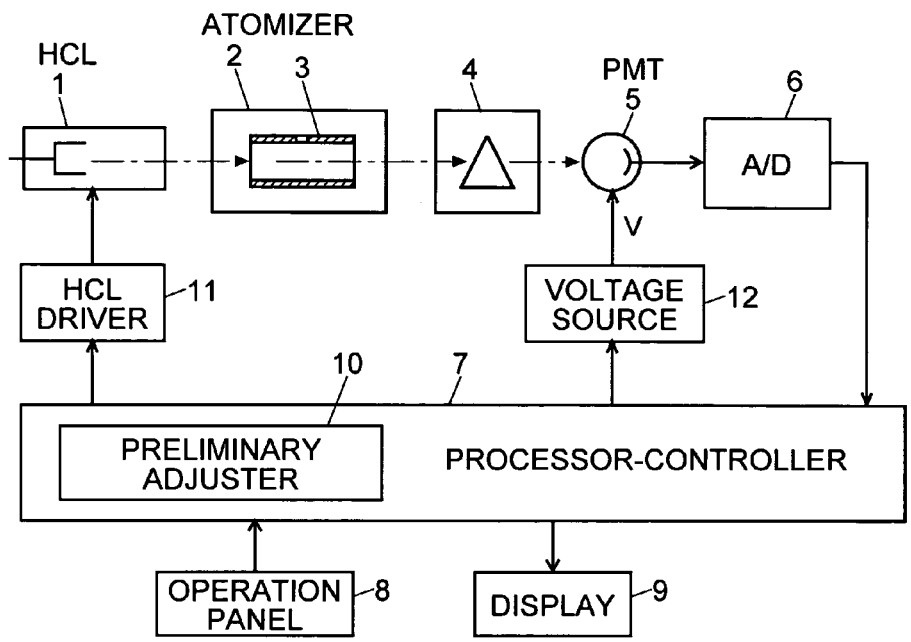
FIG. 1 is an illustration of a main part of a furnace type atomic absorption spectrophotometer embodying the present invention.

FIG. 1 schematically shows the main part of the furnace type spectrophotometer of the present embodiment. The light emitted from a self reverse type hollow cathode lamp (HCL) 1, which includes various bright lines, passes through a graphite tube 3 of a sample atomizer 2, and is introduced into a spectroscope 4. In the spectroscope 4, a ray of a preset wavelength is extracted from the incoming light, and is sent to a photodetector, which is actually a photomultiplier (PMT) 5. Appropriate optical systems for converging the rays are disposed between the HCL 1 and the sample atomizer 2, and between the sample atomizer 2 and the spectroscope 4, respectively, which are not shown in the drawings.

The light detected by the PMT 5 is converted to an electric signal, which is amplified and converted by an A/D converter 6 to a digital signal. The digitized photometric signal is given to a processor-controller 7. The processor-controller 7 is composed mainly of a personal computer, and an operational device 8 and a display device (such as a Liquid Crystal Display) 9 are connected to the processor-controller 7. A program for performing a preliminary adjustment of the background correction, which is a feature of the present invention, is installed in the processor-controller 7. When the program is run, the background correction preliminary adjuster 10 is activated, and controls the HCL driver 11, the high voltage generator 12 and other devices, as described later. The HCL driver 11 supplies the electric current to the HCL 1, and the high voltage generator 12 applies a negative high voltage to the PMT 5.

When a sample is quantitatively analyzed, first, a large electric current is supplied from a power source, not shown in the drawings, to the graphite tube 3 to heat it to a high temperature. A drop of solution of the sample is put into the graphite tube 3 through a sample inlet provided at its top, whereby the sample is atomized. The light passing through the graphite tube 3 undergoes absorption at the wavelengths characteristic of the elements contained in the sample. The processor-controller 7 calculates the ratio of the strength of light undergone the atomic absorption to that without atomic absorption, and determine the quantity of the sample from the absorption ratio.

Figure 2:
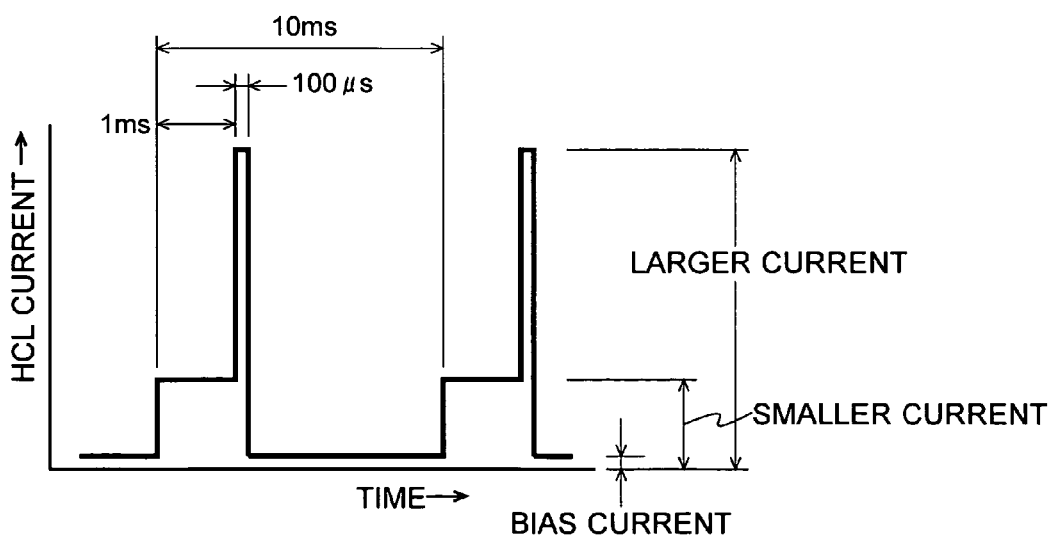
FIG. 2 is a graph showing the change of the driving current supplied to the hollow cathode lamp when the SR background correction is performed.
Figure 3:
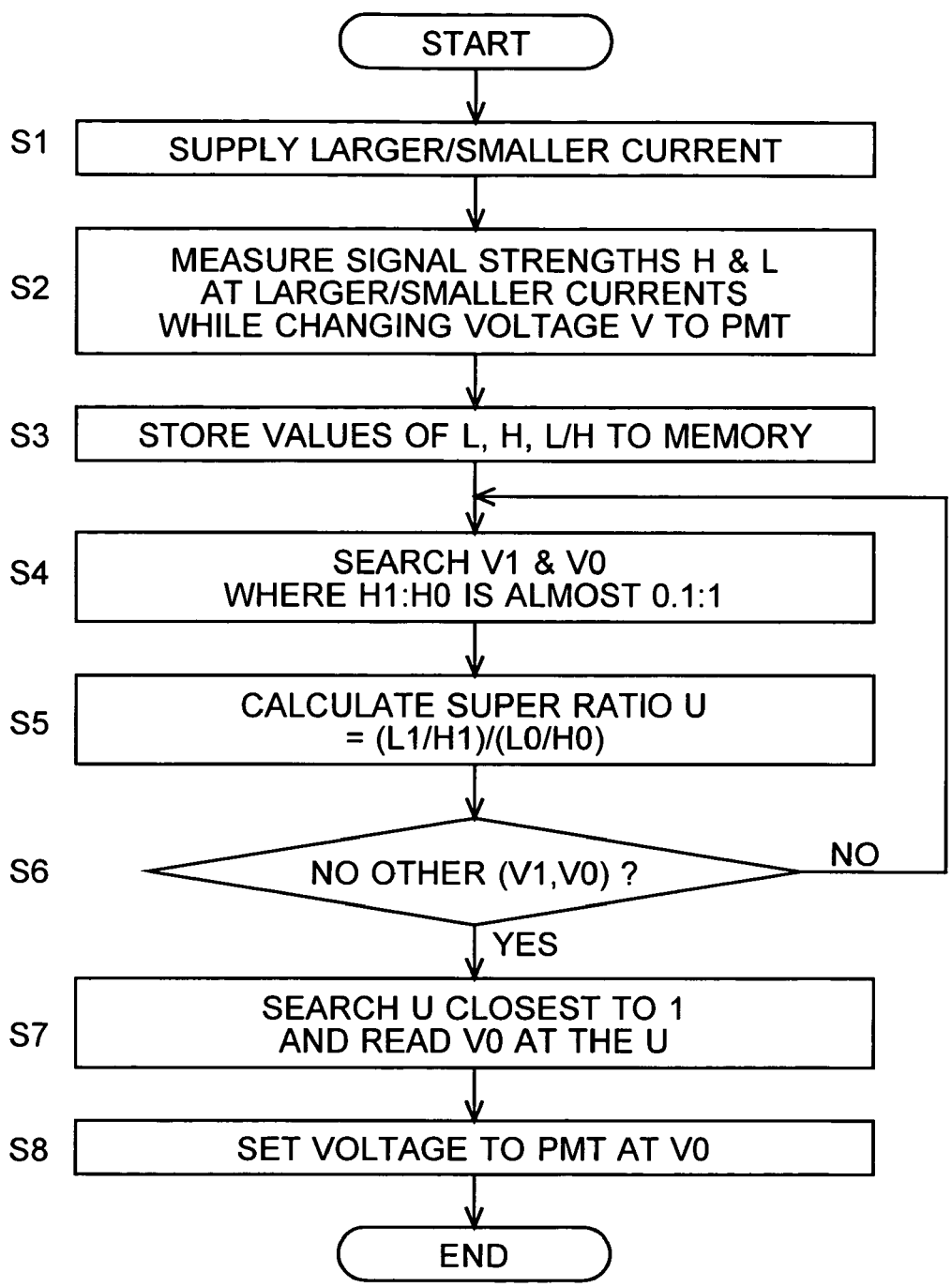
FIG. 3 is a flowchart of the process for the preliminary adjustment for the background correction in the present embodiment.
Figure 4A:
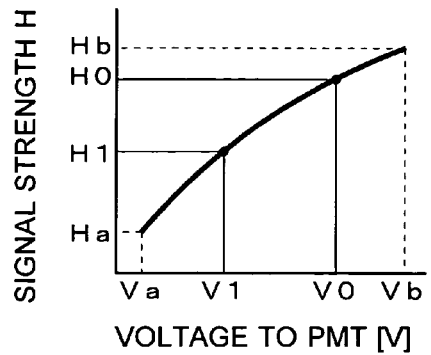
FIGS. 4A and 4B are voltage-signal strength graphs used for explaining the preliminary adjustment process.
Figure 4B:
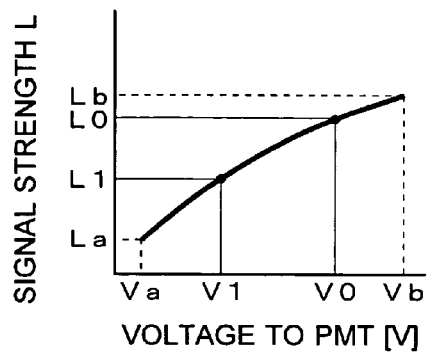

The preliminary adjustment of the SR background correction, which is a feature of the present invention, is explained referring to FIGS. 2 to 4. FIG. 2 shows the change of the HCL current, FIG. 3 is a flowchart of the preliminary adjustment process, and FIGS. 4A and 4B show voltage-signal strength graphs used for explaining the preliminary adjustment process. The preliminary adjustment process is performed as follows.

First, the processor-controller 7 controls the HCL driver 11 to supply the driving current as shown in the graph of FIG. 2 to the HCL 1 (Step S1), where the driving current includes a repetition of a smaller current and a larger current. At this time, no sample is put into the graphite tube 3, and the electric signals from the PMT 5 at the time of smaller current supply and at the time of larger current supply are respectively digitized by the A/D converter 6 and given to the processor-controller 7.

While observing the data of the signal strength, the processor-controller 7 controls the high voltage generator 12 to change the high voltage V applied to the PMT 5 stepwisely so that the signal strength H in the larger current supply period changes from a preset lowest value (0.01 V, for example) to the maximum value (10 V, for example) measurable with the circuit. At every step of the high voltage, the signal strength L in the smaller current supply period and the signal strength H in the larger current supply period are respectively measured (Step S2).

Suppose that the minimum value and the maximum value of the signal strength H are Ha and Hb respectively, and the values of V at those times are Va and Vb respectively, the changing manners of the signal strength H in the larger current supply period and of the signal strength L in the smaller current supply period are as shown in FIGS. 4A and 4B. In those graphs, the relationship between the voltage V and the signal strength H is represented by a continuous line, but actually it should be represented by a series of points because the voltage V is changed stepwisely.

The values of the signal strength H in the larger current supply period, that of the signal strength L in the smaller current supply period, and the ratio L/H at every value of V are stored in a memory in relation to the value of V (Step S3). Actually, the processes of Steps S2 and S3 are performed almost at the same time and they as a whole correspond to the preliminary measurement of the present invention.

Then, with respect to the signal strength H in the larger current supply period, two values of signal strength H0 and H1 are searched in the memory satisfying the condition that the ratio H1:H0 is almost 0.1:1, and the corresponding values V0, V1 of the voltage V (V1<V0) are read out of the memory (Step S4). Actually, in the search, a certain allowance is predetermined, and the value of the ratio falling within the allowance of the target value is determined to satisfy the condition. For example, if the ratio is within the range 0.09–0.11, the ratio is determined to satisfy the above condition. Any values of H0 and H1 can be adopted if they are between the minimum value Ha and the maximum value Hb.

Then the values of the ratio L0/H0 and L1/H1 corresponding to the voltages V0 and V1 are read out of the memory, and a super ratio U, or the ratio of the ratios, i.e., $$U=(L1/H1)/(L0/H0) \qquad (1)$$

is calculated as the judgment index value, and is stored in the memory in relation to the voltage V0 (Step S5). Thus, when two values of the signal strengths H0 and H1 whose ratio H1:H0 is almost 0.1:1 are determined, a judgment index value U is calculated.

Then another combination of voltages V1 and V0 satisfying the condition that the ratio H1:H0 is almost 0.1:1 in the larger current supply period is searched in the memory (Step S6). Since, in many cases, there are many such combinations that satisfy the above condition, the process returns to Step S4, and the process from Steps S4 to S6 is repeated to search out all the combinations of the voltages V1, V0 that satisfy the above condition and the condition of Ha<(H0, H1)<Hb, and the judgment index value U is calculated for each combination.

When, for example, a combination of V0 and V1 as shown in FIG. 4A is found, the signal strengths L0 and L1 in the smaller current supply period corresponding to the values V0 and V1 must exist as shown in FIG. 4B. Because of the principle of the SR background correction method, the signal strength H in the larger current supply period reflects the background absorption, and the signal strength L in the smaller current supply period reflects the atomic absorption and the background absorption. In the current case, though, the atomic absorption is negligible so that the signal strength L also reflects the background absorption. Thus, in order to perform the background correction at high accuracy, it is necessary that the ratio of the signals L/H is constant irrespective of the values of H and L.

As in the present embodiment, when the two signal strengths H0 and H1 (or L0 and L1) satisfy the equation $$L1/H1=L0/H0, \qquad (2)$$

the ratio of the signals L/H can be regarded as constant irrespective of the values of H and L. The equation (2) can be rewritten as $$(L1/H1)/(L0/H0)=1,$$

which shows that the accuracy of the background correction is higher as the judgment index value U is closer to 1.

The processor-controller 7 then searches for the value of the super ratio U in the memory (the number of values of U stored in the memory is not necessarily large) that is closest to 1. When the value is found, the voltage V0 corresponding to the value U is read out of the memory (Step S7), wherein V0 is the voltage at which the background correction is most adequately performed under the condition that the signal ratio H1:H0 is almost 0.1:1. Thus the voltage applied to the PMT 5 is set at V0 (Step S8), and the voltage V0 is used in the following proper measurements of the atomic absorption analysis. This is the end of the preliminary adjustment.

Thus, in the atomic absorption measurement, the background correction factor comes closest to zero, and the correction accuracy is maximized when the signal ratio H1:H0 is almost 0.1:1 in the larger current supply period, or when the background absorption is almost 1.0.

In many cases, it is practically sufficient to minimize the background correction factor for a value of the background absorption. If the background correction needs to be further improved, the following method can be used.

Figure 5:
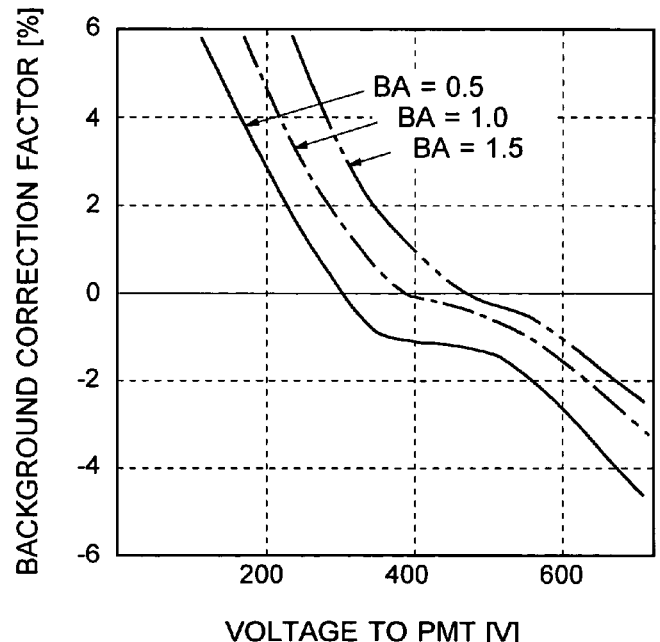
FIG. 5 is an example graph showing the relationship between the background correction factor and the voltage applied to the PMT 5 using the background absorption as a parameter.

FIG. 5 is an example graph showing the relationship between the background correction factor and the voltage applied to the PMT 5 using the background absorption as a parameter. In the previous embodiment, the voltage is determined so that the background correction factor is 0 (%) at the background absorption of 1.0. As seen in FIG. 5, the value of the voltage that yields zero background correction factor changes as the background absorption changes. Thus it is preferable to take account of several background absorptions so that the corresponding background correction factors as a whole come closer to zero in a well-balanced manner.

An example is described referring to the flowchart of FIG. 6, where three background absorptions 1.0, 0.5 and 1.5 are considered. First, for the background absorption of 1.0, two voltages V1 and V0 at which the ratio of the signal strengths H1:H0 is almost 0.1:1 in the larger current supply period is searched, and the super ratio U1 of the signal ratios L0/H0 and L1/H1 at voltages V1 and V0 is calculated as $$U1=(L1/H1)/(L0/H0)$$

Step S10).

Similarly for the background absorption of 0.5, two voltages V2 and V0 (V1<V2<V0) are searched so that the ratio of the signal strengths H1:H0 is almost 0.32:1 in the larger current supply period, and the super ratio U2 of the signal ratios L0/H0 and L2/H2 is calculated as $$U2=(L2/H2)/(L0/H0)$$

(Step S11).

For the background absorption of 1.5, also, voltage values V3 and V0 (V3<V1<V2<V0) are searched so that the ratio of the signal strengths H1:H0 is almost 0.032:1 in the larger current supply period, and the super ratio U3 of the signal ratios L0/H0 and L3/H3 is calculated as $$U3=(L3/H3)/(L0/H0)$$

(Step S12).

The three background absorptions are given weights according to their importance. Normally, the background absorption of 1.0 is most important, so that the weights of the voltages V1, V2 and V3 are given as, for example, 2:1:1. Then the voltage V0 is determined so that the values of the super ratio U1, U2 and U3 respectively come close to 1 as a whole in a well-balanced manner (Step S13). This enhances the accuracy of the background correction not only at a specific background absorption but also at several background absorptions in a well-balanced manner.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

What is claimed is:

1. An atomic absorption spectrophotometer comprising:
   a self reverse type hollow cathode lamp;
   a photomultiplier tube;
   a preliminary measurement performer for measuring a strength of a signal L when a smaller current is supplied to the hollow cathode lamp and a strength of a signal H when a larger current is supplied while a voltage V applied between a cathode and an anode of the photomultiplier is changed; and
   an optimal voltage detector for detecting a value V0 of the voltage V at which a super ratio U is closest to unity under a condition that two values V1 and V0 of the voltage V are arbitrarily chosen so that a ratio of value H1 to value H0 of the signal H or a ratio of value L1 to value L0 of the signal L is a predetermined value, where the super ratio U is defined as a ratio of a first ratio L0/H0 to a second ratio L1/H1.

2. The atomic absorption spectrophotometer according to claim 1, wherein the optimal voltage detector detects a value V0 of the voltage V so that a plurality of super ratios U come closer to unity as a whole.

3. The atomic absorption spectrophotometer according to claim 2, wherein the optimal voltage detector puts a weight to each of the plurality of super ratios U in determining they come closer to unity as a whole.

4. The atomic absorption spectrophotometer according to claim 3, wherein the optimal voltage detector puts the largest weight to the super ratio U when the ratio of H1/H0 is 10 or 0.1.

* * * * *